United States Patent
Yagiura

(10) Patent No.: US 8,797,592 B2
(45) Date of Patent: Aug. 5, 2014

(54) SYSTEM, METHOD, AND COMPUTER-READABLE RECORDING MEDIUM FOR EXECUTING PRINTING WITH IMAGE FORMING APPARATUS

(75) Inventor: Yutaka Yagiura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 380 days.

(21) Appl. No.: 12/879,170

(22) Filed: Sep. 10, 2010

(65) Prior Publication Data

US 2011/0063639 A1    Mar. 17, 2011

(30) Foreign Application Priority Data

Sep. 14, 2009 (JP) .................................. 2009-212454

(51) Int. Cl.
G06F 15/00 (2006.01)
(52) U.S. Cl.
USPC ........... 358/1.9; 358/1.18; 715/274; 715/783; 382/283
(58) Field of Classification Search
USPC ........................................................ 358/1.9
See application file for complete search history.

(56) References Cited

U.S. PATENT DOCUMENTS

| 2007/0124510 | A1 | 5/2007 | Ando |
| 2007/0165265 | A1 | 7/2007 | Ito et al. |
| 2007/0297666 | A1 | 12/2007 | Takeuchi et al. |
| 2008/0162736 | A1 | 7/2008 | Tanaka |
| 2008/0172302 | A1* | 7/2008 | Knodt ............................. 705/26 |
| 2008/0239373 | A1 | 10/2008 | Suzuki |
| 2009/0077164 | A1 | 3/2009 | Phillips et al. |
| 2010/0067035 | A1 | 3/2010 | Kawakubo et al. |

FOREIGN PATENT DOCUMENTS

| EP | 0 738 949 A1 | 10/1996 |
| EP | 0 738 956 A2 | 10/1996 |
| JP | 2007-088755 | 4/2007 |
| JP | 2007-110689 | 4/2007 |
| JP | 2008-162084 | 7/2008 |
| JP | 2008-250828 | 10/2008 |

OTHER PUBLICATIONS

Extended European search report dated Feb. 3, 2012.
Japanese Office Action dated Aug. 6, 2013.

* cited by examiner

Primary Examiner — Barbara Reinier
Assistant Examiner — Brendan McCommas
(74) Attorney, Agent, or Firm — IPUSA, PLLC

(57) ABSTRACT

A data processing system includes: an image forming apparatus including a service part configured to receive a first printing attribute and printing data and set the first printing attribute to the printing data, the first printing attribute being commonly used among different types of image forming apparatuses, a control part configured to control printing based on the kind of printing attribute set to the printing data, a data processing apparatus including a receiving part configured to receive a request including the first printing attribute, a second printing attribute, and the printing data, the second printing attribute surpassing a range of the first printing attribute, a setting part configured to set the second printing attribute to the printing data, and a transmitting part configured to transmit the printing data being set with the second printing attribute and the first printing attribute to the image forming apparatus.

8 Claims, 17 Drawing Sheets

FIG.10

| | | |
|---|---|---|
| APPLICATION BASIC DATA | APPLICATION ID | print001 |
| | USER ID | USER A |
| | COOPERATION FUNCTION IDENTIFIER | print |
| | DISPLAY NAME | PRINTING APPLICATION FILE A |
| | : | : |
| APPLICATION EXPANSION DATA | PRINTING ATTRIBUTE | ... |
| | PRINTING DATA | ... |
| | : | : |

FIG.12

| USER ID | URL FOR OBTAINING APPLICATION BASIC DATA |
|---|---|
| USER A | http://xxxxxxx |
| USER B | ... |
|  |  |

| APPLICATION ID | print001 |
|---|---|
| USER ID | USER A |
| COOPERATION FUNCTION IDENTIFIER | print |
| DISPLAY NAME | PRINTING APPLICATION FILE A |
| ⋮ | ⋮ |
| URL FOR OBTAINING APPLICATION EXPANSION DATA | ... |

SYSTEM, METHOD, AND COMPUTER-READABLE RECORDING MEDIUM FOR EXECUTING PRINTING WITH IMAGE FORMING APPARATUS

BACKGROUND OF THE INVENTION

1. Field of the Invention

The present invention relates to a system, a method, and a computer-readable recording medium for executing printing with image forming apparatus.

2. Description of the Related Art

In recent years, image forming apparatuses (mainly, multifunction machines) are provided with a platform on which applications are operated. For example, as disclosed in Japanese Laid-Open Patent Publication No. 2007-110689, there is an image forming apparatus that allows new applications to be developed and installed by using a publicly disclosed API (Application Program Interface) of a platform.

The image forming apparatus of Japanese Laid-Open Patent Publication No. 2007-110689 has an API of a JSDK platform 148. One advantage for developers of applications is that the API is device-independent (i.e. compatible with different types of image forming apparatuses). That is, as long as the API is used, the developer of an application does not need to perform, for example, coding or compiling for each type of image forming apparatus.

However, at the expense of such advantage of device compatibility, the interface of an API pertaining to printing attributes is leveled to the extent of being device-independent. Therefore, in a case of setting printing conditions with the API, there is a problem that one cannot effectively utilize the ability of an image forming apparatus for printing.

SUMMARY OF THE INVENTION

The present invention may provide a system, a method, and a computer-readable recording medium for executing printing with image forming apparatus that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a system, a method, and a computer-readable recording medium for executing printing with image forming apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing system including: an image forming apparatus including a service part configured to receive a first printing attribute and printing data and set the first printing attribute to the printing data, the first printing attribute being commonly used among different types of image forming apparatuses, a control part configured to control a printing process based on the kind of printing attribute set to the printing data, a data processing apparatus including a receiving part configured to receive a request including the first printing attribute, a second printing attribute, and the printing data, the second printing attribute surpassing a range of the first printing attribute; a setting part configured to set the second printing attribute to the printing data; and a transmitting part configured to transmit the printing data being set with the second printing attribute and the first printing attribute to the image forming apparatus.

Another embodiment provides a data processing method used in a system including an image forming apparatus and a data processing apparatus, the method including the steps of: a) receiving a first printing attribute and printing data, the first printing attribute being commonly used among different types of image forming apparatuses; b) setting the first printing attribute to the printing data; c) controlling a printing process based on the kind of printing attribute set to the printing data, d) receiving a request including the first printing attribute, a second printing attribute, and the printing data, the second printing attribute surpassing a range of the first printing attribute; e) setting the second printing attribute to the printing data; and f) transmitting the printing data being set with the second printing attribute and the first printing attribute to the image forming apparatus.

Another embodiment of the present invention provides a computer-readable recording medium on which a program is recorded for causing a computer to execute a data processing method including an image forming apparatus and a data processing apparatus, the data processing method including the steps of: a) receiving a first printing attribute and printing data, the first printing attribute being commonly used among different types of image forming apparatuses; b) setting the first printing attribute to the printing data; c) controlling a printing process based on the kind of printing attribute set to the printing data, d) receiving a request including the first printing attribute, a second printing attribute, and the printing data, the second printing attribute surpassing a range of the first printing attribute; e) setting the second printing attribute to the printing data; and f) transmitting the printing data being set with the second printing attribute and the first printing attribute to the image forming apparatus.

Other objects, features and advantages of the present invention will become more apparent from the following detailed description when read in conjunction with the accompanying drawings.

BRIEF DESCRIPTION OF THE DRAWINGS

FIG. 10 is a schematic diagram illustrating an example of application data of a printing network application according to an embodiment of the present invention;

FIG. 12 illustrates an example of a user management table according to an embodiment of the present invention;

FIG. 15 is a schematic diagram illustrating an example of a configuration of an application basic data transmitted to the provider application from the network application management part according to an embodiment of the present invention;

DETAILED DESCRIPTION OF THE PREFERRED EMBODIMENTS

Figure 1:
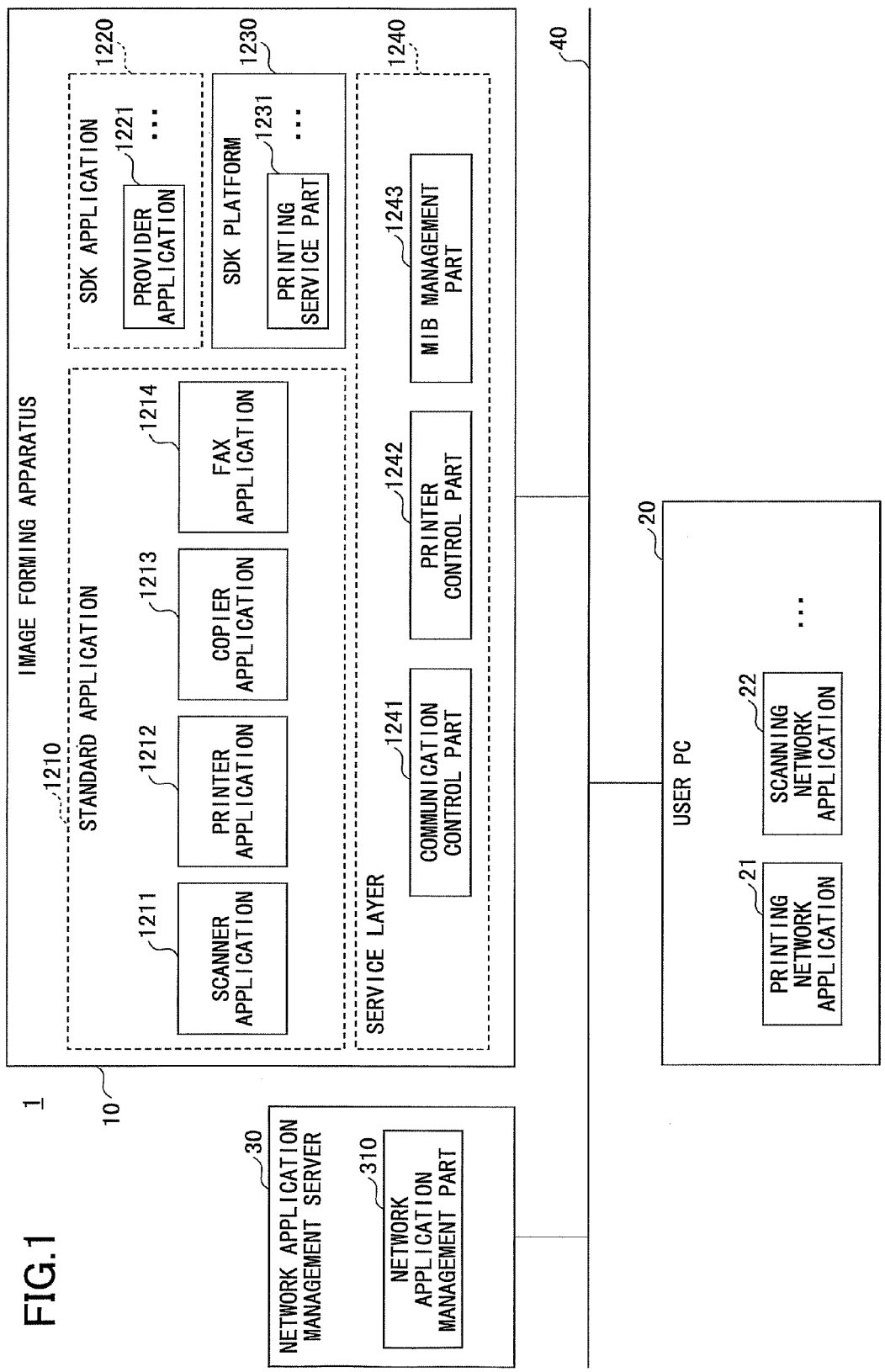
FIG. 1 is a schematic diagram illustrating an example of a configuration of a data processing system according to an embodiment of the present invention.

FIG. 1 is a schematic diagram illustrating an example of a configuration of a data processing system 1 according to an embodiment of the present invention. The data processing system 1 includes one or more image forming apparatuses 10, one or more user PCs 20, and a network application management server 30 that are connected by a wire or wireless network 40 such as a LAN.

The user PC 20 is a personal computer (PC) assigned to each user. The user PC 20 includes an application that provides various services in cooperation with the image forming apparatus 10 (hereinafter also referred to as "network application"). As examples of the network application, FIG. 1 illustrates a printing network application 21 and a scanning network application 22. The printing network application 21 is for making an image forming apparatus execute a printing job via a network. The scanning network application 22 is for performing a predetermined process (e.g., broadcast or storage) on image data scanned by the image forming apparatus 10.

It is to be noted that, although only a single user PC 20 is illustrated in FIG. 1, plural user PCs may be connected to the network 40. Further, the network application(s) included in each user PC may be different.

The network application management server 30 is a computer including a network application management part 310. For example, the network application management part 310 manages information (data) pertaining to the network applications operated by each user PC 20 and mediates communications between network applications and the image forming apparatus 10.

In this embodiment, the image forming apparatus 10 is a multifunction machine providing the functions of printing, scanning, copying, and facsimile communications inside a single housing. Alternatively, the image forming apparatus 10 may be an apparatus that provides one of the aforementioned functions (e.g., a scanner, a copier, a facsimile machine). In this embodiment, the image forming apparatus 10 may be any type of image forming apparatus as long as it is hardware having a printing function.

In FIG. 1, the image forming apparatus 10 includes, for example, a standard application 1210, an SDK (Software Development Kit) application 1220, an SDK platform 1230, and a service layer 1240.

The standard application 1210 is a collection of applications installed beforehand (at the time of shipment) in the image forming apparatus 10. In the example illustrated in FIG. 1, the standard application 1210 includes a scanner application 1211, a printer application 1212, a copier application 1213, and a fax application 1214. The scanner application 1211 executes scanning jobs. The printer application 1212 receives printing data via the network 40 and executes a printing job based on the received printing data. That is, the printing data transmitted to the printing port of the image forming apparatus 10 is processed by the printer application 1212. It is to be noted that the format in which the printing data can be processed by the printer application 1212 is not limited to PDL (Page Description Language). The printer application 1212 may receive and process printing data in a format such as PDF (Portable Document Format) or TIFF (Tagged Image File Format). Accordingly, in the following description where data is described as "printing data", the data is not limited to data in PDL format.

The copier application 1213 executes a copying job. The fax application 1214 executes a facsimile transmission job and a facsimile reception job.

The service layer 1240 is a group of software modules that provide, for example, control functions of various hardware resources and management functions of management data to superordinate applications and the like. In the example of FIG. 1, the service layer 1240 includes a communication control part 1241, a printer control part 1242, and a MIB (Management Information Base) control part 1243. The communication control part 1241 performs controls of network communications. For example, the reception of printing data by the printer applications 1212 is performed via the communication control part 1241. The MIB management part 1243 manages MIB data stored in a storage device of the image forming apparatus 10. In this embodiment, the MIB data includes a parameter (object) indicating the status of a printing job.

The SDK application 1220 is an application that is additionally installed (after shipment of the image forming apparatus 10) as a plug-in for expanding the functions of the image forming apparatus 10. In the example of FIG. 1, the SDK application 1220 includes a provider application 1221.

The provider application 1221 controls execution of functions performed by the image forming apparatus 10. In this embodiment, the provider application 1221 instructs the printer application 1212 to execute a printing job in response to a request from the printing network application 21.

The SDK platform 1230 provides an execution environment of the SDK application 1220. That is, the SDK application 1220 is the application operated on the SDK platform 1230. Each SDK application is capable of allowing each function of the image forming apparatus 10 to be used (executed) via an API (Application Program Interface) provided by the SDK platform 1230. For example, such API (hereinafter also referred to as "SDAPI") includes an interface for using the scanning function, an interface for using the printing function, and an interface for using the copying function. In FIG. 1, the printing service part 1231 is called via an interface for using the printing function. In this embodiment, the printing service part 1231 is called by the provider application 1221 receiving a printing request from the printing network application 21.

The SDKAPI is a device-independent smoothed interface which can be used regardless of the type of image forming apparatus 10 (made common among various types of image forming apparatuses 10). That is, the differences among the types of image forming apparatuses 10 can be absorbed by the SDK platform 1230. Thereby, compatibility among different types of image forming apparatuses 10 can be ensured. However, at the cost of such compatibility, function which is unique to a certain type of image forming apparatus 10 could not be used. For example, a printing setting (printing condition) unique to a particular type of image forming apparatus 10 could not be used.

Further, the fact that the SDK platform 1230 uses a Java (registered trademark) virtual machine contributes to the smoothing of the SDKAPI. That is, the SDK application 1220 is installed as a Java (registered trademark) application. Therefore, the SDK platform 1230 also inherits the device-independent property of Java (registered trademark). However, it is not always necessary to use Java (registered trademark) in order to attain the device-independent property.

In FIG. 1, plural software pertaining to the printing function are illustrated. Next, the relationship of the plural software is described with the following example.

The communication control part 1241 opens the printing port and stands by for allowing the printer application 1212 to receive printing data. For example, the printing data transmitted from the port monitor 23 of the user PC 20 (i.e. printing data transmitted via a printer driver after instructing printing by using typical word processing software) is received by the communication control part 1241 via a printing port 1241p (Step S10) and is input to the printer application 1212 (Step S11). The printer application 1212 executes a printing job based on the received printing data. In the process of executing the printing job, the printer application 1212 controls the hardware (below-describer printer 13) of the image forming apparatus 10 by using the printer control part 1242 (Step S12). Further, the printer application 1212 updates MIB data pertaining to the status of the printing job in correspondence with the progress of the printing job (Step S13).

The printing information transmitted from the printing network application 21 is received by the network application management part 310 (Step S21). In this embodiment, the printing information includes data pertaining to printing data and printing attributes. Printing attributes are data defining how the printing data are to be output. In general, the printing attributes are also referred to as "printing setting information (printing setting data)" or "printing conditions". The printing attributes include plural items. A value is set to each of the items of the printing attributes. The network application management part 310 processes the printing information into data usable for the interface and transmits the modified printing information to the provider application 1221 (Step S22). The processing of the printing information refers to mainly setting (recording) a part of the printing attributes to the printing data. The provider application 1221 inputs a request (printing request) for printing the received printing information to the printing service part 1231 (Step S23). The inputting of the printing request is performed via a device-independent SDKAPI provided by the printing service part 1231. The printing service part 1231 processes the printing data of the printing request input from the provider application 1221 and transmits the processed printing data to the printing port 1241p (Step S24). In this embodiment, the processing of printing data is mainly a process of setting printing attributes, which were not changed into printing data by the network application management part 121, to printing data.

The printing data transmitted from the printing service part 1231 to the printing port 1241p are processed by the printer application 1212 in the same manner as regular printing data (i.e. printing data transmitted from the port monitor 23) (Steps S11-S13).

The printing service part 1231 routinely monitors (polling) the status data of the printing job of the printing request from the provider application 1221 (Step S31). In a case where the status of the printing job changes, the printing service part 1231 reports the status change to the SDK application.

On the other hand, in a case of the printer application 1212 that only uses the printing port 1241p as the interface, the status change of the printing job cannot be fed back (reported). Further, compatibility among different types of image forming apparatuses 10 is not guaranteed for the management system and the like of the MIB data of the MIB management part 1243. Therefore, the SDK application 1220 may lose its device-independent property in a case where the SDK application 1220 attempts to directly access the MIB management part 1243.

Accordingly, in a case where the status of a printing job is desired to be traced, the provider application 1221 is to be installed as the SDK application 1220. It is to be noted that the processes in Step S23 and after may not only be applied to the provider application 1221 but also to the SDK application 122 using the printing service part 1231.

Figure 2:
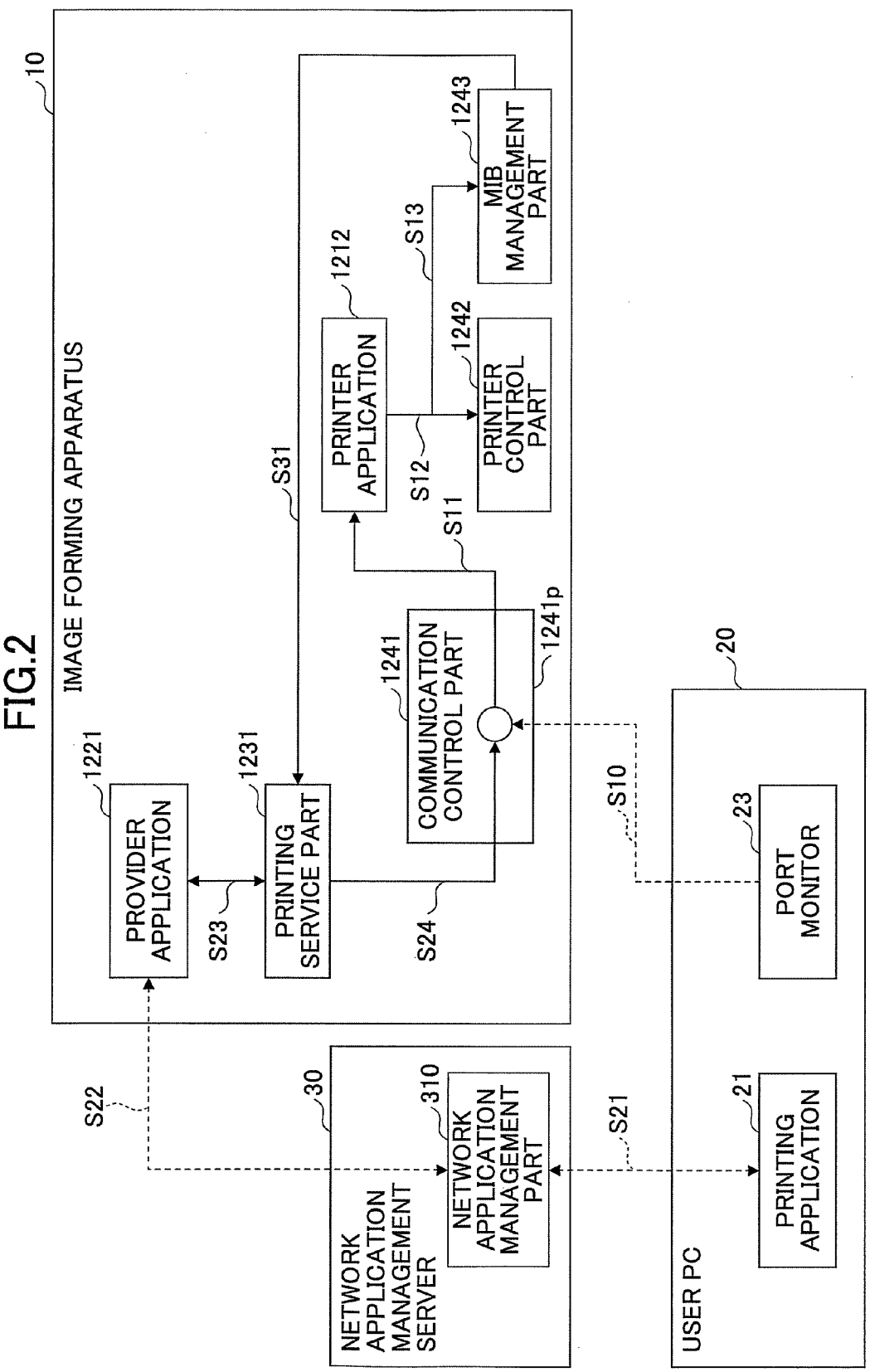
FIG. 2 is a schematic diagram illustrating a relationship of software pertaining to a printing function according to an embodiment of the present invention.

In the example of FIG. 2, the interfaces for receiving printing information are provided at five locations in a case where the printing network application 21 is used to execute a printing job. The first interface is located at the printing network application 21. The printing network application 21 has an interface for receiving printing attributes from the user. The interface of the printing network application 21 is provided, for example, by a screen or a file. The second interface is located at the network application management part 310. The network application management part 310 has an interface for receiving a printing attributes and printing data from the printing network application 21. The interface of the network application management part 310 is provided as a communications API (Application Program Interface). Accordingly, the printing network application 21 transmits printing attributes and printing data to the network application management part 310 via the communications API (hereinafter also referred to as "network application API"). It is to be note that "communications API" is an API which uses, for example, a HTTP (HyperText Transfer Protocol) message(s) or a SOAP (Simple Object Access Protocol) message(s) as a medium. The third interface is located at the provider application 1221. The provider application 1221 has an interface for receiving printing attributes and printing data from the network application management part 310. The interface of the provider application 1221 is provided as a communications API. The fourth interface is located at the printing service part 1231. The printing service part 1231 has a SDKAPI for receiving printing attributes and printing data from the provider application 1221. The fifth interface is located at the printer application 1212. The printer application 1212 has an interface (printing port 1241p) for receiving printing data from the printing service part 1231. It is to be noted that, although the printing port 1241p is illustrated in a manner included in the communication control part 1241, the printing port 1241p is described as being included in the printer application 1212 because the printing port 1241p is provided in correspondence with a request from the printer application 1212.

The data that can be received by the five interfaces are different. This aspect of the five interfaces is explained with reference to FIG. 3.

Figure 3:
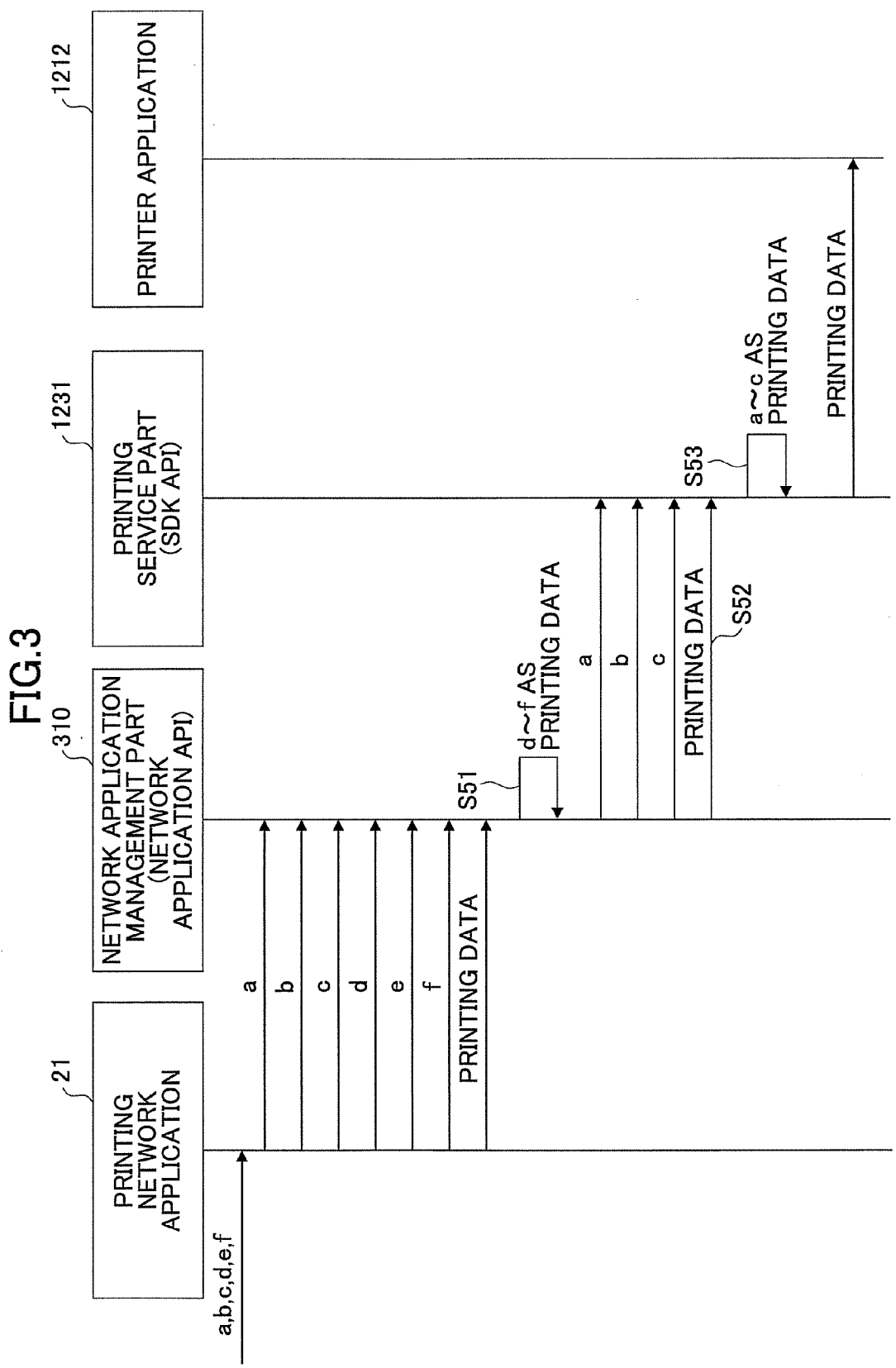
FIG. 3 is a schematic diagram for describing relationships of each interface for receiving printing information.

FIG. 3 is a schematic diagram for describing relationships of each interface for receiving printing information. In FIG. 3, the alphabet letters a-f indicate the items of printing attributes, respectively. In FIG. 3, the provider application 1221 is omitted. This is because i) the parameters that can be designated with the API of the provider application 1221 depends on the SDKAPI of the printing service part 1231 and ii) the printing attributes that can be designated with respect to the provider application 1221 match with the printing attributes that can be designated with respect to the printing service part 1231.

FIG. 3 illustrates that the printing network application 21 can receive (accept) printing attributes a-f. Further, FIG. 3 illustrates that the network application API provided by the network application management part 310 can designate the printing attributes a-f and printing data. Further, FIG. 3 illustrates that the SDKAPI provided by the printing service part 1231 can designate the printing attributes a-c and printing data. Further, FIG. 3 illustrates that printing data can be transmitted to the printing application 1212. In other words, the printer application 1212 does not provide an interface for receiving setting values of printing attributes separately from receiving printing data.

In FIG. 3, although each of the printing attributes and printing data are illustrated in a manner assigned with corresponding arrows with respect to the input of the network application management part 310 (network application API) and the printing service part 1231 (SDKAPI), the arrows are merely illustrated for enhancing the visibility of the differences among the printing attributes that can be designated and do not indicate the unit of communication. That is, with respect to the network application API, the printing attributes a-f and the printing data may all be transmitted at a single time or transmitted separately. Likewise, with respect to the SDKAPI, the printing attributes a-c and the printing data may all be transmitted at a single time or transmitted separately.

As evident in FIG. 3, the printing attributes that can be designated with the SDKAPI and the printing attributes that can be designated with the network API are different. More specifically, the printing attributes (a-c) that can be designated with SDKAPI are less than the printing attributes (a-f) that can be designated with the network API. In other words, the range of printing attributes that can be designated with the network API encompasses the range of printing attributes that can be designated with the SDKAPI.

This is because, the SDKAPI is for supporting printing attributes common among various types of image forming apparatuses (hereinafter also referred to as "common printing attributes") whereas the network application API is additionally capable of supporting printing attributes surpassing the range of the common printing attributes (hereinafter also referred to as "unique network application printing attributes"). That is, in FIG. 3, the printing attributes a-c correspond to the common printing attributes. On the other hand, the printing attributes d-f correspond to the unique network application printing attributes. It is to be noted that the SDAKPI is not only independent from the type of image forming apparatus but is also independent from the data format of the printing data. That is, although the printer application 1212 has a function of interpreting printing data, the printing data that can be interpreted differs depending on the kind of printing application installed in the printing apparatus 10. Depending on the printing data that can be interpreted, the printing attributes that can be interpreted could be different. Therefore, in order to assure operations regardless of the kind of printing application 1212 installed in the image forming apparatus 10, the SDKAPI of the printing service part 1231 is defined to support printing attributes that can be commonly interpreted by various kinds of printing applications 1212. Therefore, the common printing attributes are technically printing attributes that are common among different types of image forming apparatuses and different kinds of printing applications. If there is a fixed relationship between the types of image forming apparatus 10 and the kind of printing application 1212, printing attributes that are common among different types of image forming apparatuses 10 could also signify that the printing attributes are common among different kinds of printing applications 1212.

The difference between the common printing attributes and the unique network application printing attributes is not limited to the difference in the items of printing attributes. For example, the common printing attribute and the unique network application printing attribute could be different in a case where the printing attributes correspond to the same item but have different values (setting values). More specifically, with respect to an item "paper-size", a setting value which could not be designated with the common printing attribute (e.g., a paper-size of a special type of a paper or a paper-size the same as or larger than that of A2 paper) may be handled as the unique network application printing attribute.

Next, the significance of the unique network application printing attributes is described (significance of defining the unique network application printing attributes).

There is a strong demand for the SDKAPI to provide compatibility with many types of image forming apparatuses 10. The SDK application 1220 is developed using the SDKAPI for normally operating on the SDK platform of any type of image forming apparatus and is sold to unspecified users in the market. In other words, the type of image forming apparatus which is to use the SDK application 1220 cannot be determined at the time of developing or selling the SDK application. Under this circumstance, the applicable coverage of the SDKAPI (the range of printing attributes that can be designated with the SDKAPI) tends to be small. This is because the applicable range is the range to be guaranteed by manufacturers of the image forming apparatus 10.

On the other hand, it is rare for all types of image forming apparatuses available in the market to be placed in a user's environment such as an office. In most cases, plural image forming apparatuses of the same type or a single image forming apparatus is placed in the user's environment. In other words, the types of image forming apparatuses used in the user's environment are extremely limited compared to those of the market targeted for the SDK application 1220. The range of functions that can be commonly used among image forming apparatuses in the actual user's environment is wider than the range of functions that can be commonly used with the SDKAPI.

Accordingly, in this embodiment, printing attributes surpassing the range of the SDKAPI (i.e. unique network application printing attributes) can be set with the network application API. Moreover, the unique network application printing attributes can be set with the printing network application 21.

However, even if the network application management part 310 is able to receive (accept) the printing attributes d-f via the network application API, the printing attributes d-f cannot be designated with the SDKAPI. Therefore, the network application management part 310 performs settings (Step S51 of FIG. 3) on the printing data of the unique network application printing attributes. The setting of printing data of the unique network application printing attributes signifies generating printing data including, for example, commands pertaining to the printing attributes. More specifically, the setting of printing data of the unique network application printing attributes signifies generating new printing data including printing data before being set with printing attributes and commands corresponding to the printing attributes. It is to be noted that existing languages such as PJL (Printer Job Language) may be used for writing the commands.

Accordingly, in Step S52 of FIG. 3, the printing data input to the printing service part 1231 are new printing data set with setting values of printing attributes d-f.

The printing service part 1231 receiving the printing data via the SDKAPI performs setting of printing data on the printing attributes a-c designated with the SDKAPI (Step S53 in FIG. 3). In this case, the printing service part 1231 does not eliminate the printing attributes already set to the printing data (unique network application printing attributes). As a result, printing data set with printing attributes a-f are transmitted to the printer application 1212.

It is to be noted that the range of the unique network application printing attributes that can be designated with the network application API may be defined in accordance with the user's environment as a part of a process of designing the information system of the user's environment (customized use) or defined with respect to a every user's environment (common use). Even if the range of the unique network application printing attributes is defined in accordance with the user's environment, the range of the unique network application printing attributes is not limited to a range of printing attributes that are common among all of the types of image forming apparatuses in the user's environment. For example, a printing attribute applicable for a single type of image forming apparatus in the user's environment may be included in the unique network application printing attributes.

Next, the printing network application 21, the network application management part 310, and the provider application 1221 are described in detail.

Figure 4:
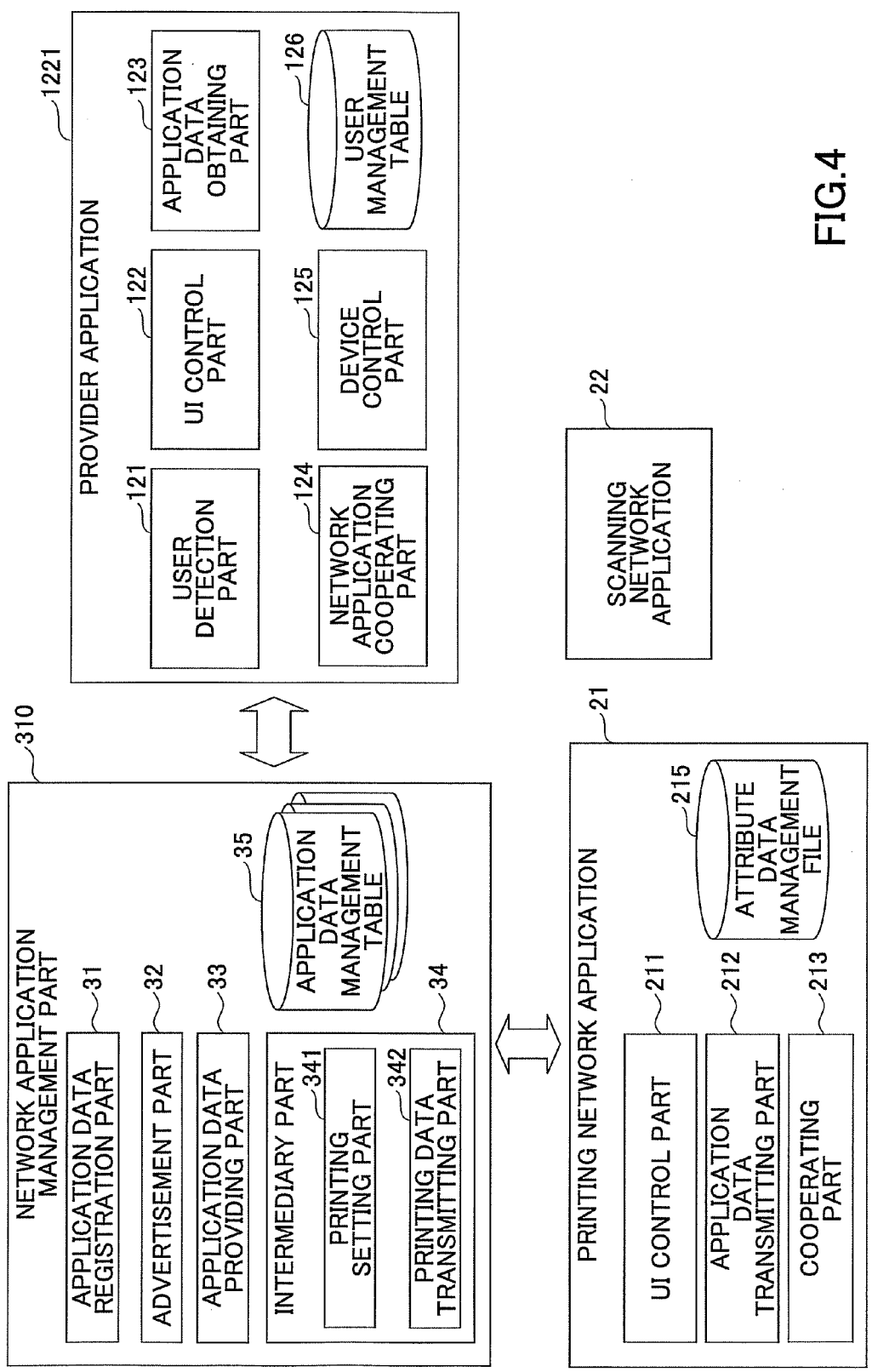
FIG. 4 is a schematic diagram illustrating exemplary configurations of a printing network application, a network application management part, and a provider application according to an embodiment of the present invention.

FIG. 4 is a schematic diagram illustrating exemplary configurations of the printing network application 21, the network application management part 310, and the provider application 1221.

In the example of FIG. 4, the printing network application 21 includes, for example, a UI control part 211, an application data transmitting part 212, a cooperating part 213, and an attribute data management file 215.

The UI control part 211 displays various screens pertaining to the printing network application 21 on a display device of the user' PC. The application data transmitting part 212 transmits requests for registering application data of the printing network application 21 to the network application management server 30 in accordance with input printing instructions. The application data includes data required for executing the printing network application 21. The cooperating part 213 controls communications (e.g., exchanging of data) for cooperating with the image forming apparatus 10. The attribute data management file 215 stores attribute data of the printing network application 21. The attribute data includes, for example, an identifier of the printing network application 21 (application ID), user ID of the user (owner) of the printing network application 21, and initial values of printing attributes (e.g., data indicating printing conditions).

The user ID of the user (owner) of each network application is recorded in the attribute data management file 215 of the printing network application 21. Accordingly, each network application belongs to a user. Therefore, even if the network applications are the same, the network applications are distinguished from each other in a case where user of the network application is different. For example, a network application belonging to user A, as a rule, is only permitted to be used for user A. Likewise, a network application belonging to user B, as a rule, is only permitted to be used for user B. However, by granting access to other users with the access control function, each user may use network applications belonging to other users.

It is to be noted that the scanning network application 22 includes the same functions or data as those of the UI control part 21, the application data transmitting part 212, the cooperating part 213, and the attribute data management file 215. The difference with the printing network application 21 is that the data to be processed by the scanning network application 22 is image data scanned by the image forming apparatus 10.

The network application management part 310 includes, for example, an application data registration part 31, an advertisement part 32, an application data providing part 32, and an intermediary part 34. The application data registration part 31 receives a request for registering application data transmitted from the network application and stores the application data in an application data management table 35. The application data management table 35 is generated in a storage device the network application management server 30 in correspondence with each user. That is, each application data management table 35 manages application data of the network application belonging to a corresponding user. It is to be noted that the application data includes printing attributes and printing data. That is, the application data registration part 31 provides the network application API to the printing network application 21.

The advertisement part 32 advertises (e.g., broadcasts or multi-casts), for example, the user ID included in the application data received by the application data registration part 31 on the network 40. The advertising by the advertisement part 32 is performed in units of users (units of user IDs). More specifically, in a case where new application data for user A is received after the user ID of user A is advertised, advertising for the newly received application data is not performed. That is, the advertisement advertised by the advertisement part 32 includes data for notifying the provider application 1221 that a new user has been permitted to use a network application. The advertising may, however, be performed in units of application data. In this case, however, an advertisement for the same user may be redundantly issued. Nevertheless, this redundancy can be eliminated at the side of the provider application 1221. The application data providing part 33 provides (transmits) application data registered in the application data management table 35 to the provider application 1221 in response to a request from the provider application 1221. The intermediary part 34 mediates the communications between the network application and the provider application 1221. Further, the intermediary part 34 includes unique elements such as a printing setting part 341 and printing data transmitting part 342 in correspondence with the printing network application 21.

The printing setting part 341 performs settings on a unique network application printing attribute(s) included in the printing attributes received together with the printing data by the application data registration part 31. The printing data transmitting part 342 transmits the printing data to which the unique network application printing attribute is set (applied)

by the printing setting part 341 and common printing attributes to the provider application 1221.

It is to be noted that any one of the user PCs 20 may also serve as the network application management server 30. That is, the network application management part 310 may be installed in one of the user PCs 20 or each of the user PCs.

The provider application 1221 includes, for example, a user detection part 121, a UI control part 122, an application data obtaining part 123, a network application cooperating part 124, a function control part 125, and a user management table 126.

The user detection part 121 detects the existence of a user permitted to use a network application(s) based on the advertisement issued by the network application management part 310 and registers, for example, the user ID included in the advertisement in the user management table. The user management table 126 is for managing users in the network 40 that can use the network application. The UI control part 122 receives input of, for example, instructions for controlling the network application from the user. That is, although the network application is provided in the user PC 20, the network application may also be controlled from a control panel of the image forming apparatus 10. The application data obtaining part 123 obtains application data of the network application belonging to a user selected from the users registered in the user management table from the network application management part 310. The network application cooperating part 124 controls communications with respect to the network application (network application management part 310). Accordingly, the interface for receiving printing data complying with SDKAPI is provided by the network application cooperating part 124. The function control part 125 controls the execution of a function requested by a network application. For example, printing or scanning is executed according to the control of the function control part 125.

Figure 5:
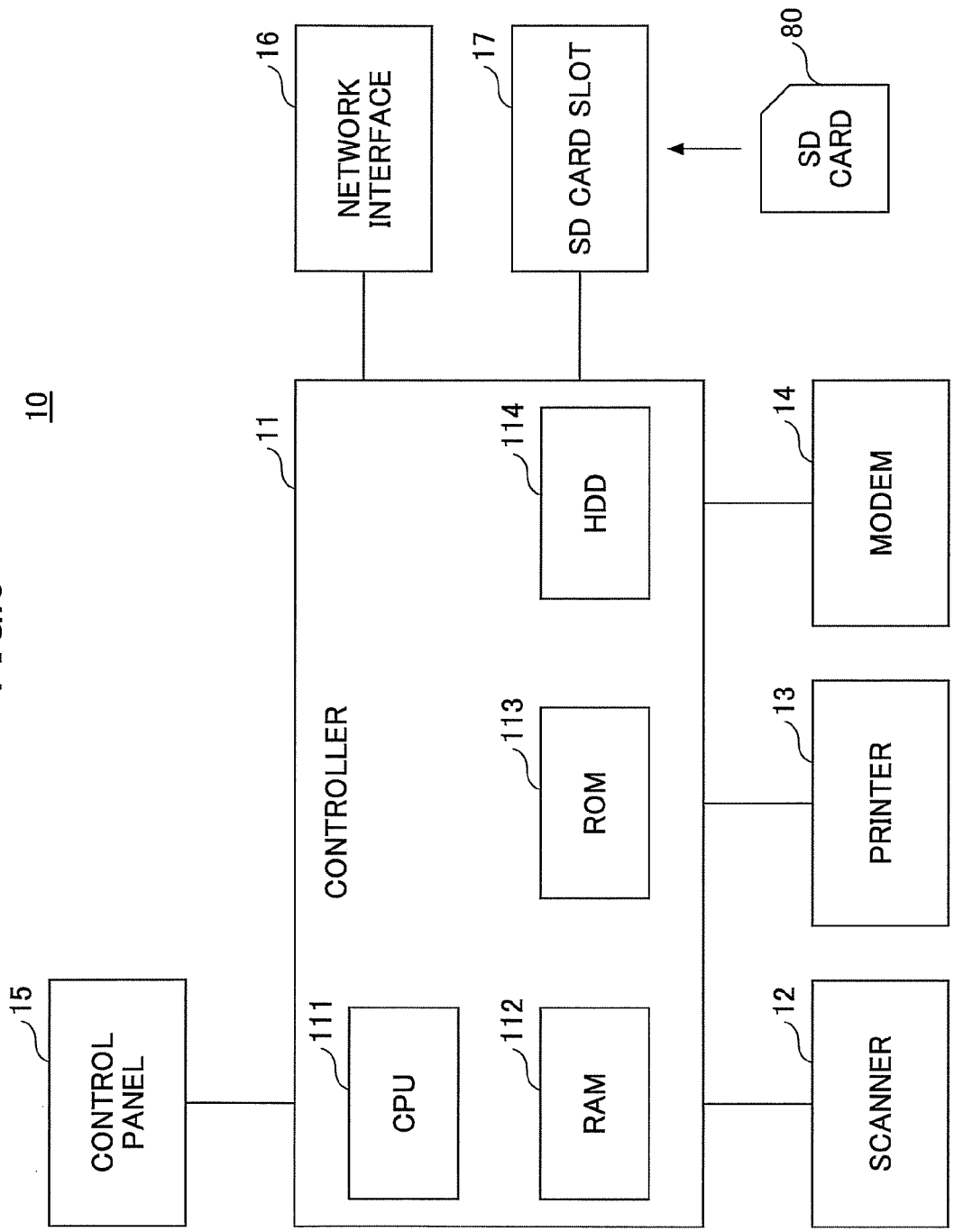
FIG. 5 is a schematic diagram illustrating an example of a hardware configuration of an image forming apparatus according to an embodiment of the present invention.

Next, hardware configurations of each of the apparatuses (10, 20) of the data processing system 1 are described. FIG. 5 illustrates an example of a hardware configuration of the image forming apparatus 10 according to an embodiment of the present invention. In FIG. 5, the image forming apparatus 10 includes hardware components such as a controller 11, a scanner 12, a printer 13, a modem 14, a control panel 15, a network interface 16, and a SD card slot.

The controller 11 includes, for example, a CPU 111, a RAM 112, a ROM 113, and a HDD 114. Various programs and data used by the programs are recorded in the ROM 113. The RAM 112 is used as a storage space to which a program is loaded or as a work space for the loaded program. The CPU 111 executes various functions by processing the program loaded to the RAM 112. Various programs and data used by the programs are recorded in the HDD 114.

The scanner 12 is hardware for reading image data from a document. The printer 13 is hardware for printing a image on a sheet(s) of paper. The modem 14 is hardware for connecting to a telephone line and transmitting/receiving image data by facsimile communications. The control panel 15 is hardware including an input part such as a button(s) for receiving input from a user and a display part such as a liquid crystal panel. The network interface 16 is hardware for connecting (by wire or wireless) to a network such as LAN. The SD-card slot 17 is for reading a program recorded in an SD card 80. In other words, the image forming apparatus 10 does not only execute a program recorded in the ROM 113 but also executes a program read from the SD card 80 and loaded to the RAM 112. It is to be noted that the SD card 80 may be replaced with other recording media (e.g., CD-ROM or a USB (Universal Serial Bus) memory). That is, the type of recording medium equivalent to the SD-card 80 is not to be limited in particular. In this case, the SD-card slot 17 may be replaced with hardware corresponding to the type of recording medium.

Figure 6:
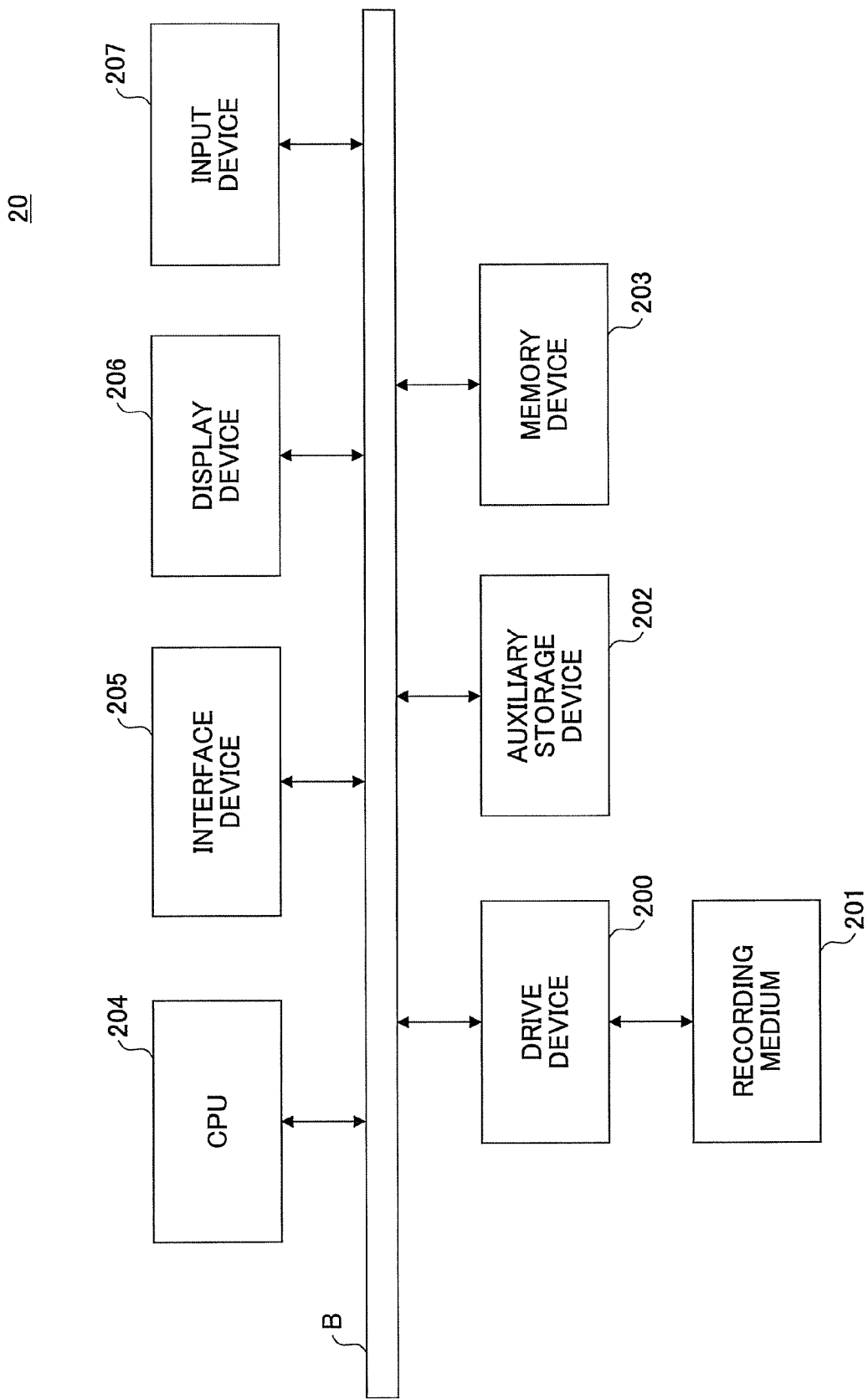
FIG. 6 is a schematic diagram illustrating an example of a hardware configuration of a user PC according to an embodiment of the present invention.

FIG. 6 is a schematic diagram illustrating an example of a hardware configuration of the user PC 20 according to an embodiment of the present invention. The user PC of FIG. 6 includes, for example, a driver device 200, an auxiliary storage device 202, a memory device 203, a CPU 204, an interface device, and a display device 206 that are connected by a bus B.

In this embodiment, a program for executing processes with the user PC 20 is provided by a recording medium 201 such as a CD-ROM. When the recording medium 201 on which the program is recorded is placed in the drive device 200, the program is installed from the recording medium 201 to the auxiliary storage device 202 via the drive device 200. However, the installing of the program does not always need to be executed by using the recording medium 201. For example, the program may be downloaded from another computer via a network. The auxiliary storage device 202 stores, for example, the installed program(s) and necessary files and data therein.

In a case where there is a command to activate the program, the memory device 203 reads out the program from the auxiliary storage device 202 and stores the program therein. The CPU 204 performs the functions of the user PC 20 in accordance with the program stored in the memory device 203. The interface device 205 is used as an interface for connecting to the network. The display device 206 displays, for example, a GUI (Graphical User Interface) of the program. The input device 207 includes, for example, a keyboard and a mouse for inputting various controls and instructions (commands).

Figure 7:
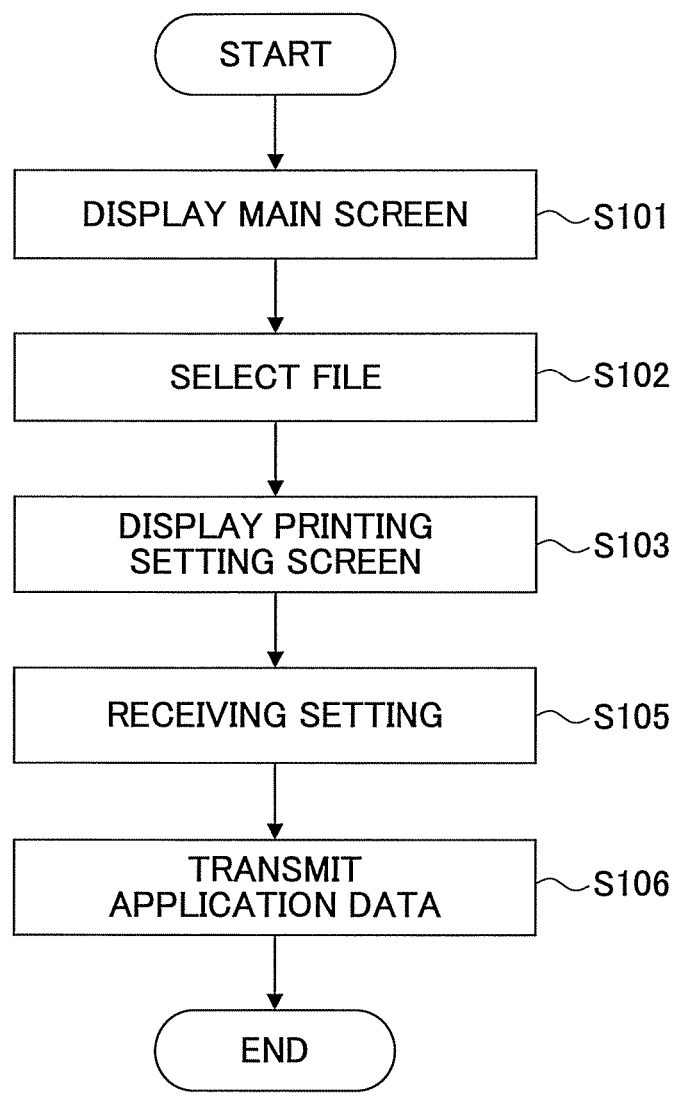
FIG. 7 is a flowchart for describing processes of an operation of a printing network application of a user PC according to an embodiment of the present invention.

Next, an example of the processes of an operation of the data processing system 1 according to an embodiment of the present invention is described with reference to FIG. 7. FIG. 7 is a flowchart for describing the processes of an operation of the printing network application 21 of the user PC 20.

In response to an input instruction to activate the printing network application 21 from the user of the user PC 20, the UI control part 211 displays a main screen of the printing network application 21 on the display device 206 (Step S101). Then, the UI control part 211 receives a selection of a document file (target of a printing process) from the user (Step S102). For example, the document file selected by the user may be a document file having a data format that can be directly processed by the printer application 1212 such as a PDF file or a TIFF file. The selection of the document file may be performed by, for example, dragging & dropping an icon corresponding to a document file to a screen of the printing network application 21.

Figure 8:
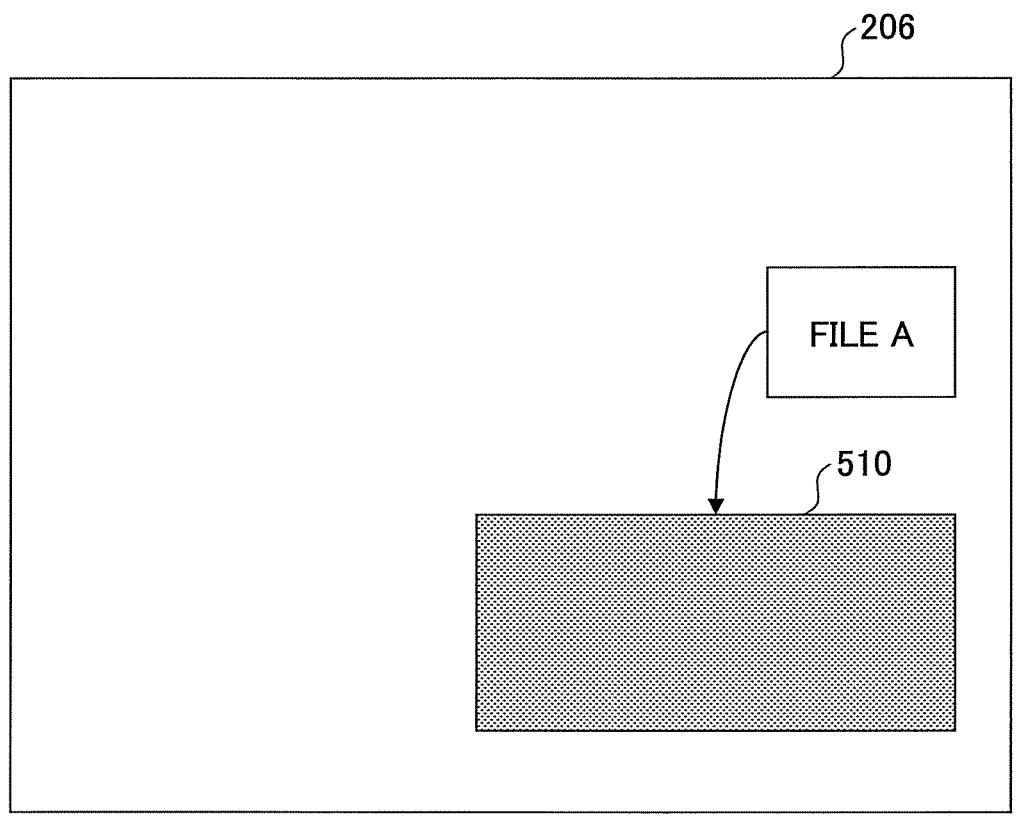
FIG. 8 is a schematic diagram illustrating an example of dragging & dropping an icon corresponding to a document file to a main screen displayed on a display device according to an embodiment of the present invention.

FIG. 8 is a schematic diagram illustrating an example of dragging & dropping an icon corresponding to a document file to a main screen 510 displayed on the display device 206. Although the main screen 510 is merely illustrated as a simple rectangular shape, the main screen 510 may include a display component such as a tool bar or a pull-down menu. Further, the selection of the document file may be performed by using a file dialog (dialog used for enabling selection of a file existing on a file system) displayed by selecting a tool button or an item on a menu.

In response to the selection of the document file, the UI control part 211 records the file name of the selected document file in the memory device 203.

Then, the UI control part 211 displays an icon of the selected document file on the main screen 510 along with displaying a printing setting screen on the display device 206 (Step S103).

Figure 9:
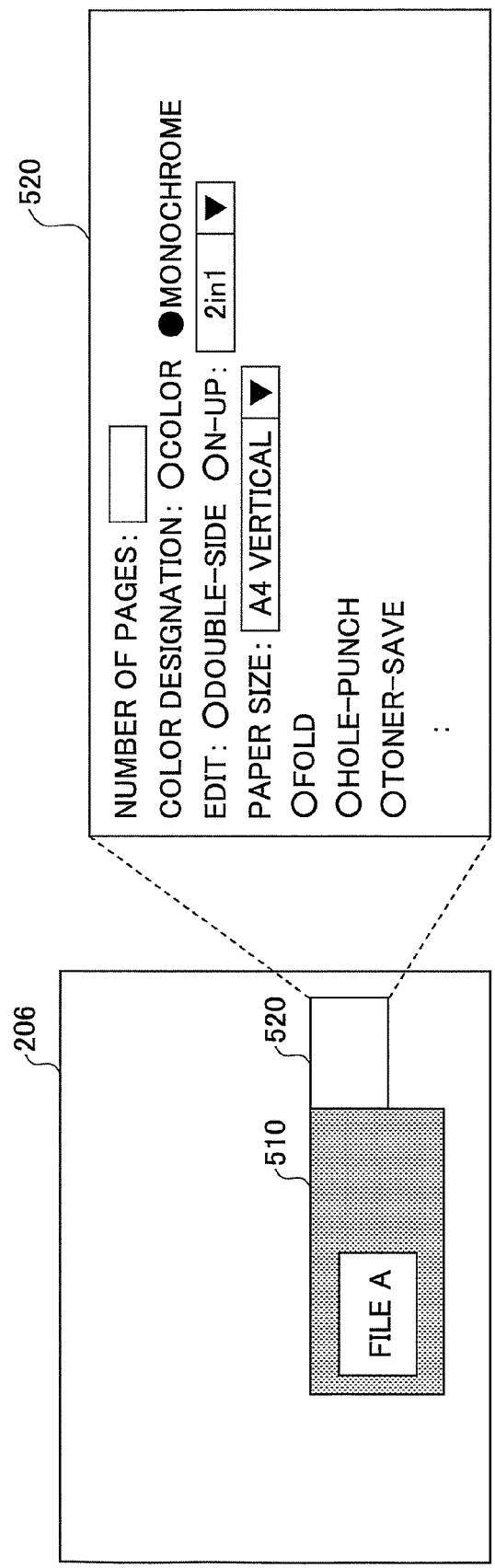
FIG. 9 illustrates an example of a printing setting screen displayed on a display device according to an embodiment of the present invention.

FIG. 9 illustrates an example of a printing setting screen 520 displayed on the display device 206. In FIG. 9, the printing setting screen 520 is displayed on the right Side of the main screen 510. The printing setting screen 520 is illustrated in more detail on the right side of FIG. 9. As described in FIG. 3, by using the printing setting screen 520, the common printing attributes and the unique network application printing attributes can be set. In the example of FIG. 9, printing attributes such as "number of pages", "color designation", "double-side printing", "n-up printing", "paper size", "folding", "hole-punching", and "toner saving" can be set with the printing setting screen 520. Among these printing attributes, "number of pages", "color designation", "double-side printing", "n-up printing" and "a part of paper size (regular paper size)" belong to the common printing attributes. On the other hand, "another part of paper (special paper size)", "folding", "hole-punching", and "toner-saving" belong to the unique network application printing attributes. The attribute "toner saving" is a mode for performing a printing process with a controlled amount of toner. It is to be noted that the items of the printing attributes are merely examples. The kinds of attributes are not limited in particular.

When the value of each printing attribute in the printing setting screen 510 are set, the UI control part 211 records the set printing attributes in the memory device 203 (Step S105). Then, the application data transmitting part 211 generates application data of the printing network application, 21 based on the data obtained in the above-steps and transmits a request to register the generated application data to the network application management server 30 (Step S106). It is to be noted that data (e.g., IP address or host name) required for communicating with the network application management server 30 are registered beforehand in each user PC 20.

FIG. 10 is a schematic diagram illustrating an example of application data of the printing network application 21. In FIG. 10, the application data can be categorized into application basic data and application expansion data. The application basic data includes data that are to be commonly included in each network application (e.g., application ID, user ID, cooperation function identifier, and display name).

The application ID is identification data for uniquely identifying each network application. The user ID is identification data of the user that owns the printing network application 21. The cooperation function identifier is data for identifying a required function of the image forming apparatus 10 cooperating with the printing network application 21 (that is, function used by the printing network application 21). Examples of the cooperation function identifiers are "print" and "scan". The cooperation function identifier "print" indicates a printing function. The cooperation function identifier "scan" indicates a scanning function. The printing network application 21 uses the printing function of the image forming apparatus 10. Therefore, in the example of FIG. 10, "print" is the cooperation function identifier. The display name is a character string for displaying the name of the network application. It is to be noted that, the application ID, the user ID, and the cooperation function identifier may be obtained from, for example, the attribute data management file 215. Further, the display name is generated based on the name of the file (file name) to be printed and the name of the printing network application 21. The name of the printing network application 21 is obtained from the attribute data management file 215.

On the other hand, the application expansion data may be different for each printing network application 21. With the printing network application 21, printing attributes and printing data may be included in the application expansion data. The printing attributes are printing attributes set with the printing setting screen 510. However, the printing attributes may include values stored in the attribute data management file 215. The printing data is the document file which is to be printed.

That is, the transmission of application expansion data by the printing network application 21 corresponds to transmitting of the printing attributes a-f and the printing data described with FIG. 3. Therefore, the format of the application data complies with the network application API.

It is to be noted that the application data does not need to be transmitted to the network application management server 30 at a single time. For example, the application data may be transmitted in units of items (e.g., attributes) or the application basic data and the application expansion data may be transmitted separately.

Figure 11:
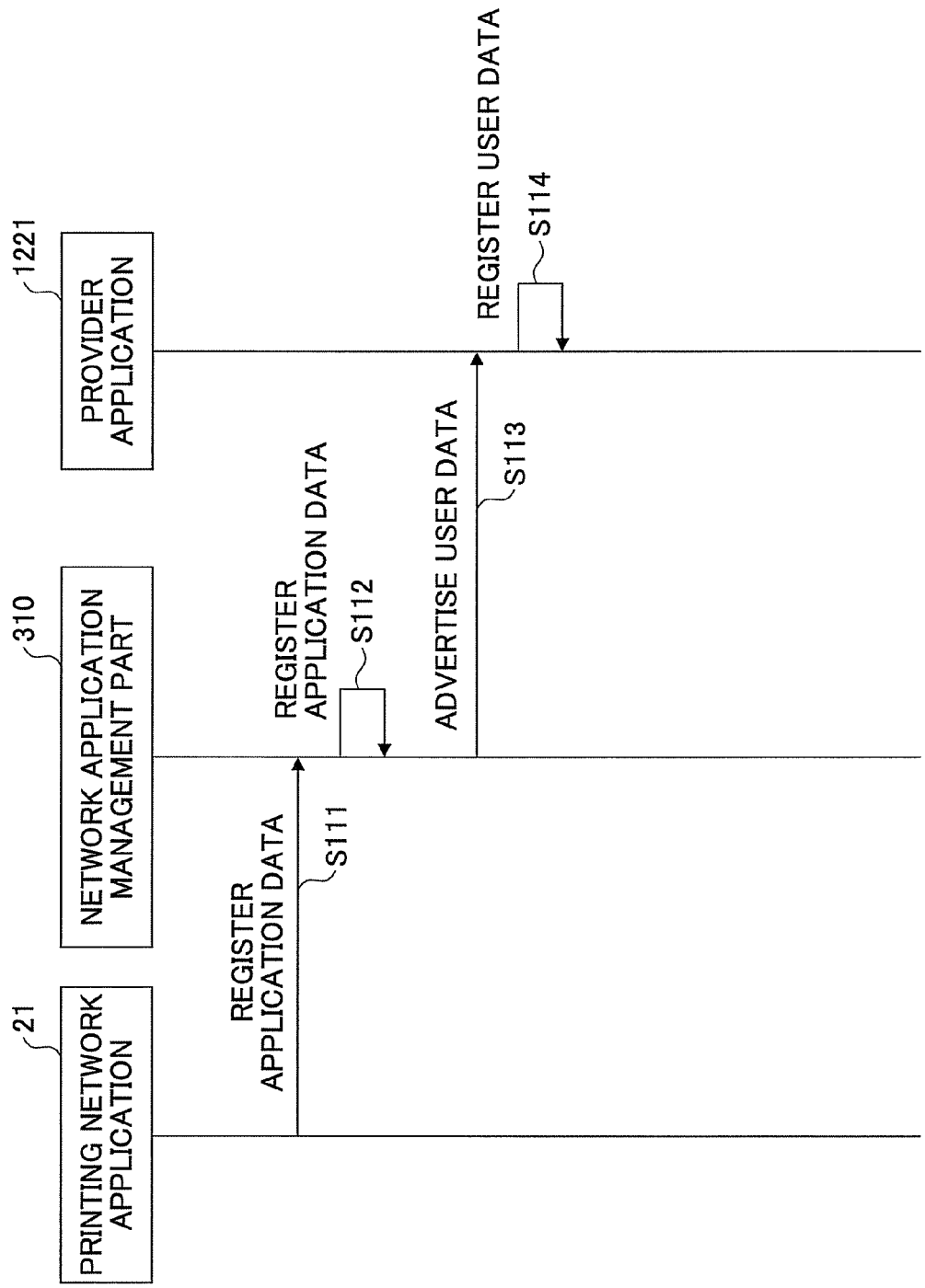
FIG. 11 is a sequence diagram for describing processes in a case of transmitting application data according to an embodiment of the present invention.

Next, processes executed in response to the transmission of application data in Step S106 of FIG. 7 are described with reference to FIG. 11. FIG. 11 is a sequence diagram for describing processes in a case of transmitting application data.

In Step S111, application data transmitted from the application data transmitting part 212 of the printing network application 21 are received by the application data registration part 31 of the network application management part 310. The application data registration part 31 registers the received application data in an application data management table 35 corresponding to the user ID included in the received application data. In a case where there is no application data management table 35 corresponding to the user ID, the application data registration part 31 generates an application data management table corresponding to the user ID and registers the received application data in the generated application data management table 35 (Step S112).

In a case where an application data management table 35 is newly generated (in a case where application data is registered for the first time in correspondence with the user having the user ID included in the received application data), the advertisement part 32 issues an advertisement in the network 40 (Step S113). The advertisement includes the user ID included in the received application data and the application basic data obtaining URL (Uniform Resource Locator). The application basic data obtaining URL is a unique URL assigned to each application data management table 35. For example, upon generating a new application data management table 35, the application data registration part 31 generates an application basic data obtaining URL corresponding to the generated application data management table 35. In this example, the application data management table 35 is in correspondence with each user. Therefore, the application basic data obtaining URL is unique for each user.

Then, when the user detection part 121 of the provider application 1221 receives the advertisement, the provider application 1221 registers the user ID and the application basic data obtaining URL included in the received advertisement in the user management table 126 (Step S114).

FIG. 12 illustrates an example of the user management table 126 according to an embodiment of the present invention. As illustrated in FIG. 12, the user management table 126 manages combinations (pairs) of the user ID and the application basic data obtaining URL. FIG. 12 illustrates records corresponding to users A and B registered in the user management table 126. It is to be noted that the user management table 126 is stored in, for example, the HDD 114.

Then, after instructing a printing process to the user PC 20 via the printing network application 21, the user goes to the image forming apparatus 10 at a given timing and controls the printing network application 21 by operating on, for example, the control panel 15 of the image forming apparatus 10. It is to be noted that, in a case where the plural image forming apparatuses 10 are connected to the network 40, the same advertisement is received by the user detection part 121 of each image forming apparatus 10 and the user IDs and application basic data obtaining URL are registered in the user management table 126 of each image forming apparatus 10. Therefore, the user can instruct any one of the image forming apparatuses 10 to execute the processes illustrated in the below-described FIG. 13.

Figure 13:
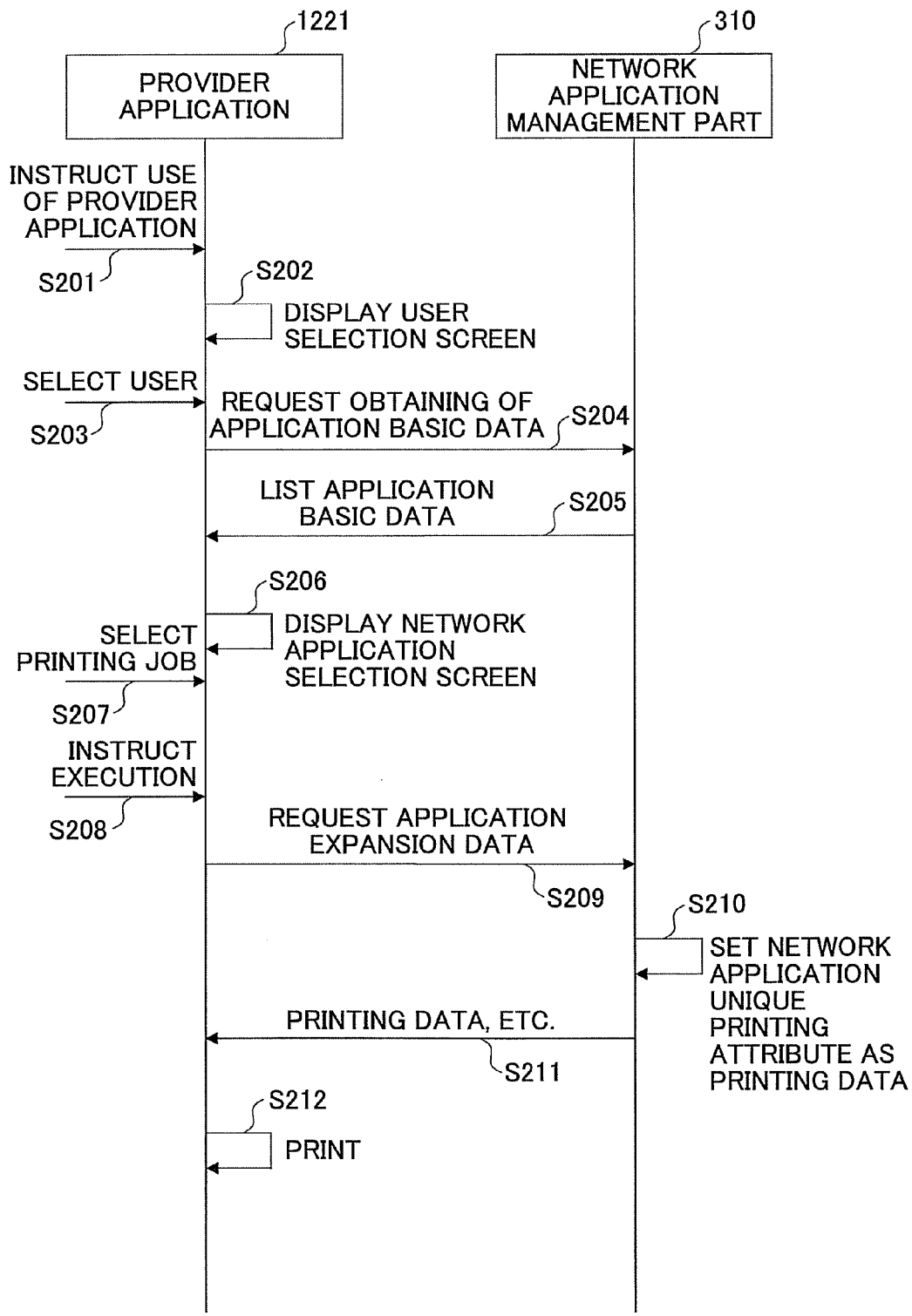
FIG. 13 is a sequence diagram for describing a case of controlling a printing network application 21 from an image forming apparatus 10 according to an embodiment of the present invention.

FIG. 13 is a sequence diagram for describing a case of controlling the printing network application 21 from the image forming apparatus 10 according to an embodiment of the present invention.

In a case where the user inputs an instruction to use the provider application 1221 to the image forming apparatus 10 via the control panel 15 (Step S201), the UI control part 122 of the provider application 1221 displays a user selection screen 610 (see FIG. 14) on the control panel 15 based on data registered in the user management table 126 (Step S202).

Figure 14:
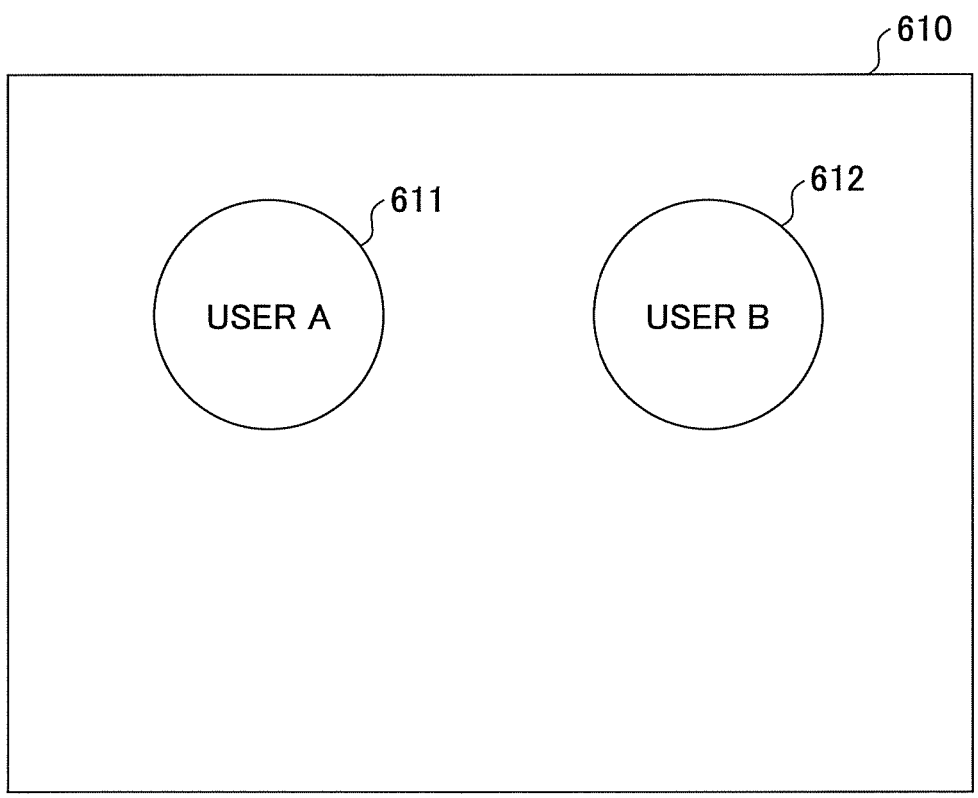
FIG. 14 is a schematic diagram illustrating an example of a user selection screen according to an embodiment of the present invention.

FIG. 14 is a schematic diagram illustrating an example of the user selection screen 610 according to an embodiment of the present invention. In the user selection screen 610, buttons are displayed in correspondence with each user ID. The example of FIG. 14 displays a button 611 corresponding to user A and a button 612 corresponding to user B.

Then, the user presses (selects) a button on the user selection screen 610 that corresponds to the user's user ID (Step S203). In response to the pressing of the button, the application data obtaining part 123 obtains the application basic data obtaining URL associated to the user ID corresponding to the pressed (selected) button, from the user management table 126. In response to the pressing of the button corresponding to the user ID, user verification may be performed so that only a verified user can execute the below-described processes (steps).

Then, the application data obtaining part 123 transmits a request to obtain application basic data (application basic data obtaining request) to the application basic data obtaining URL (Step S204). The application basic data obtaining request is received by the application data providing part 33 of the network application management part 310. The application data providing part 33 obtains application basic data of all network application registered in the application data management table 35 corresponding to the application basic data obtaining URL (i.e. the application data management table 35 corresponding to the user that is currently operating the image forming apparatus 10) and transmits a list of the obtained application basic data to the provider application 1221 (Step S205). When transmitting the list of the application basic data, the application data providing part 33 generates a URL corresponding to each network application for transmitting application expansion data of each network application (hereinafter also referred to as "application expansion data obtaining URL"). The application data providing part 33 attaches the generated application expansion data obtaining URL to the application basic data corresponding to each network application and transmits a list of application basic data attached with the application expansion data obtaining URL. Accordingly, the application basic data transmitted in Step S205 has a configuration such as the example illustrated in FIG. 15.

FIG. 15 is a schematic diagram illustrating an example of a configuration of the application basic data transmitted to the provider application 1221 from the network application management part 310 according to an embodiment of the present invention.

In the example of the application basic data illustrated in FIG. 15, the application expansion data obtaining URL is attached to the application basic data of FIG. 12. In Step S205, a list of application basic data as illustrated in FIG. 15 is transmitted to the provider application 1221. In this example, the list of application basic data may be a list in which only a single unit of application basic data is included.

Then, the UI control part 122 of the provider application 1221 records the received list of application basic data in the RAM 112 and displays a network application selection screen 620 based on the list of the application basic data (Step S206).

Figure 16:
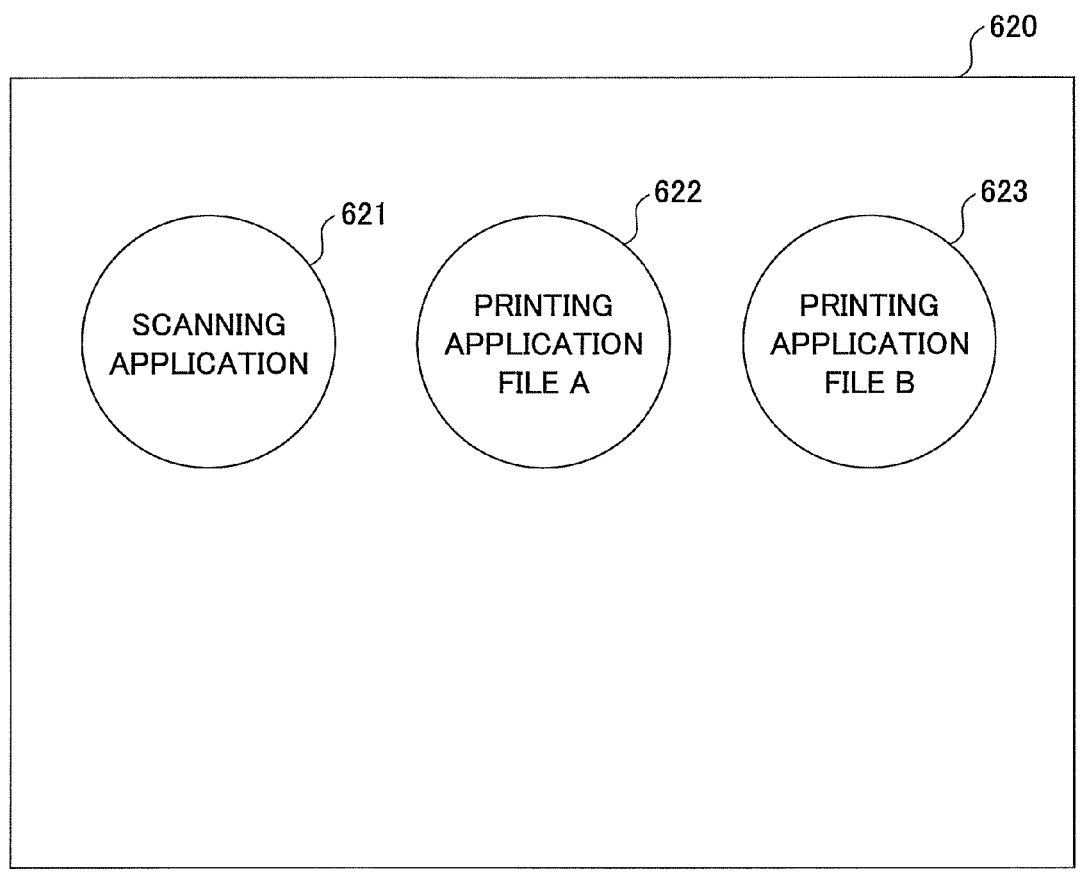
FIG. 16 is a schematic diagram illustrating an example of a network application selection screen according to an embodiment of the present invention.

FIG. 16 is a schematic diagram illustrating an example of the network application selection screen 620 according to an embodiment of the present invention. In FIG. 16, buttons are displayed in correspondence with each network application in the network application selection screen 620. In FIG. 16, button 621 corresponds to the scanning network application 22, button 622 corresponds to a printing network application for an instruction to print a file A, and button 623 corresponds to a printing network application for an instruction to print file B.

Then, in a case where one of the buttons corresponding to the printing network application 21 for one of the printing jobs is selected (Step S207) and a start key on the control panel 15 is pressed (input of instruction to start executing a printing process) (Step S208), the network application cooperating part 124 determines that the printing process is to be executed based on the cooperation identifier ("print") included in the application basic data corresponding to the pressed button (hereinafter also referred to as "current application basic data"). In order to execute the printing process, it is necessary to obtain printing setting data and printing data. Therefore, the network application cooperating part 124 transmits a request to transmit application expansion data (application expansion data transmission request) to the application expansion data obtaining URL included in the current application basic data (Step S209).

The application expansion data transmission request is received by the intermediary part 34 of the network application management part 310. The intermediary part 34 obtains application data corresponding to the application expansion data obtaining URL from the application management table 35. In a case where the cooperation function identifier included in the application data is "print", the intermediary part 34 instructs the printing setting part 341 and the printing data transmitting part 342 to execute processes corresponding to the application expansion data transmission request.

First, the printing setting part 341 performs a process of setting printing attributes included in the application data on the printing data included in the application data (Step S210). More specifically, among the printing attributes of the application data, the printing setting part 341 sets (applies) unique network application printing attributes to the printing data. That is, the process described in Step S51 of FIG. 3 is executed. Then, the printing data transmitting part 342 returns (transmits) printing data being set (applied) with the unique network application printing attributes and the common printing attributes to the network application cooperating part 124 (Step S211). That is, Step S211 corresponds to the process of transmitting the printing attributes a-c and the printing data of Step S52 of FIG. 3.

The network application cooperating part 124 inputs the received printing data and common printing attributes to the function control part 125. The function control part 125 inputs the printing request corresponding to the received printing data and the common printing attributes to the printing service part 1231 of the SDK platform 1230. As a result, a printing job is executed based on the printing data and the common printing attributes (Step S212).

It is to be noted that the processes in FIG. 11 may be performed in parallel with the processes in FIG. 13. More specifically, based on a request to register application data from a network application of a user PC belonging to user different from the user currently using the image forming apparatus 10, the user ID included in the network application may be registered in the user management table 126 of the image forming apparatus 10.

Figure 17:
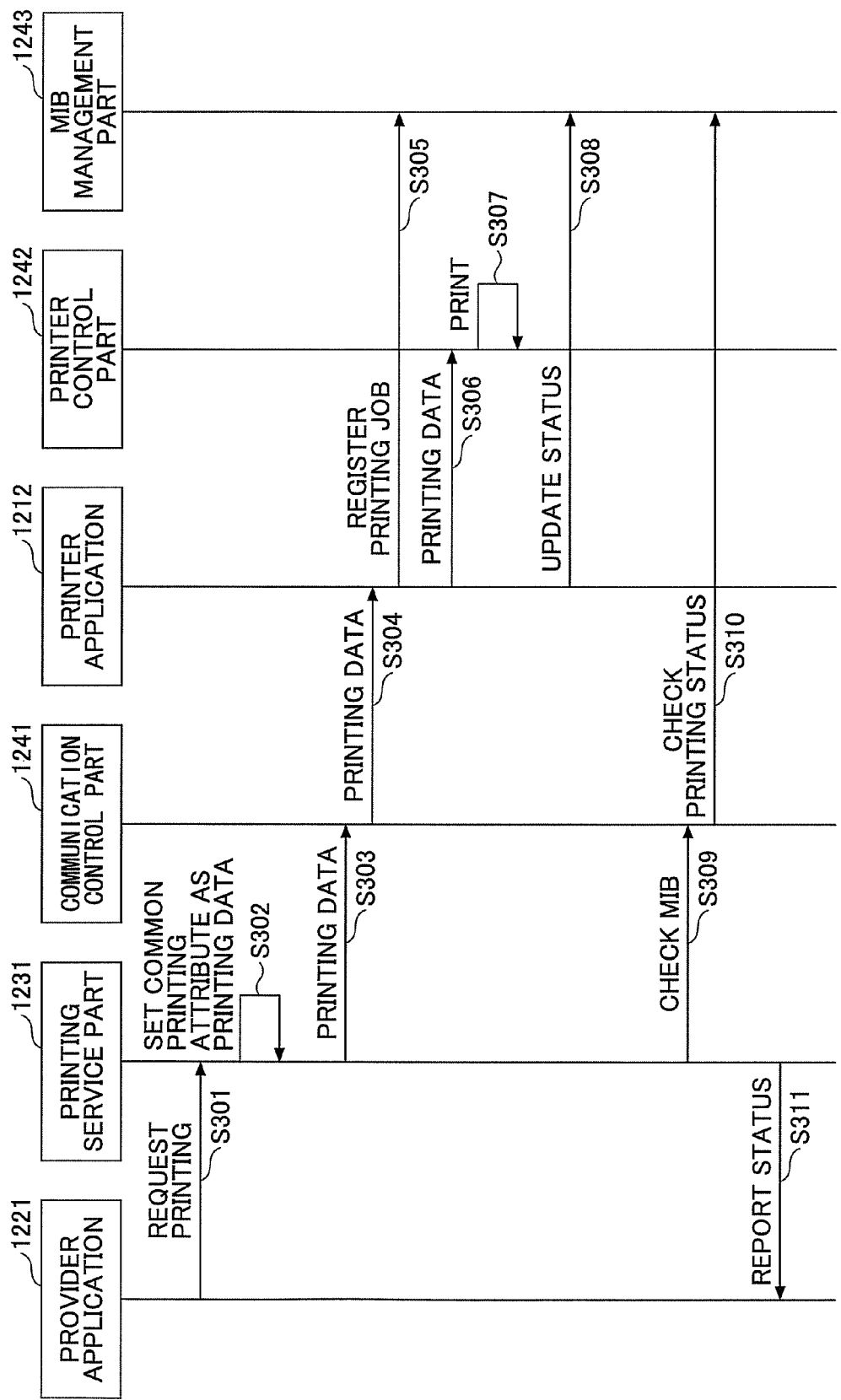
FIG. 17 is a sequence diagram for describing processing of a printing process (printing operation) executed in accordance with a request from a printing network application according to an embodiment of the present invention.

Next, Step S212 is described in further detail. FIG. 17 is a sequence diagram for describing processing of a printing process (printing operation) executed in accordance with a request from the printing network application 21 according to an embodiment of the present invention.

In Step S301, the function control part 125 of the provider application 1221 inputs a printing request to the printing service part 1231 via the SDKAPI. Printing data and common printing attributes are designated in the printing request. The printing data and the common printing attributes are the data transferred from the printing data transmitting part 342 in Step S211 of FIG. 13.

In response to the input printing request, the printing service part 1231 sets (applies) common printing attributes (which are input together with the printing request) to the printing data (Step S302). That is, the process of Step S53 of FIG. 3 is executed in Step S302. Accordingly, the printing data generated in Step S302 is set (applied) with unique network application printing attributes and common printing attributes.

In setting the common printing attributes to the printing data, the printing service part 1231 may correct the content (value) of the common printing attributes according to the type of image forming apparatus 10. For example, in a case where the number of pages is set to a value surpassing "100" even though the upper limit of number of pages that can be printed by the image forming apparatus 10 is "100", the value of the number of pages can be corrected to a value equal to or less than 100.

The printing service part 1231 switches commands of the common printing attribute according to the data format of the printing data. More specifically, in a case where the printing data is PDF, the command for double-side printing is "@PJL DUPLEX=ON¥n@PJL SET BINDING=LEFT". On the other hand, in a case where the printing data is TIFF, the command for double-side printing is, for example, "both-side". The switching of commands may also be performed when setting the unique network application printing attributes with the printing setting part 341 of the network application management part 310.

Then, the printing service part 1231 transmits the printing data to the printer application 1212 via the printing port 1241p of the communication control part 1241 (Steps S303, S304). in response to receiving the printing data, the printer application 1212 returns (transmits) a job ID of a printing job corresponding to the printing data to the printing service part 1231.

Then, the printer application 1212 registers (generates) an object for the printing job in the MIB management part 1243 (Step S305). Reference can be made to the object based on the job ID. Then, the printer application 1212 interprets printing attributes (common printing attributes and unique network application printing attributes) set to the printing data and inputs commands corresponding to the printing attributes and image data in the printing data to the printer control part 1242 (Step S306). It is to be noted that, among the unique network application printing attributes, the printer application 1212 regularly interprets the printing attributes that are applicable to (that is, attributes that can be handled by) the image forming apparatus 10 and inputs commands to the printer control part 1242. As a result, a printing process can be executed with printing attributes surpassing the range that can be set with the SDKAPI (i.e. range of the common printing attributes).

On the other hand, among the unique network application printing attributes, the printing attributes, which are not applicable to the image forming apparatus 10, cannot be interpreted by the printer application 1212. The case where the printing attributes cannot be interpreted not only includes a case where a printing attribute (item) is not applicable to the image forming apparatus 10 but also a case where a setting value surpasses a limit (e.g., upper limit) of the image forming apparatus 10 even though the printing attribute (item) can be applicable to the image forming apparatus 10. In this case, the printer application 1212 ignores the unique network application printing attributes that cannot be interpreted. That is, such unique network application printing attributes are invalidated.

In a case where there is a conflict between the common printing attributes and the unique network application printing attributes (e.g., a case where a selective or an exclusive value is set to the common printing attributes and the unique network application printing attributes), the printer application 1212 prioritizes the unique network application printing attributes and invalidates the common printing attributes.

It is to be noted that, in a case where a value that is not applicable to (i.e. cannot be handled by) the image forming apparatus 10 is set to the common printing attributes (e.g., a case where a set value surpasses an upper limit), the printing service part 1231 (SDK platform 1230) was performed a correcting process. However, the printer application 1212, as a rule, does not perform such correction on the unique network application printing attributes. This is largely due to the difference positions (significance) of the SDK platform 1230 and the printer application 1212.

That is, the SDK platform 1230 absorbs the differences among different types of image forming apparatuses and provides an environment that allows different types of image forming apparatuses to operate as similar as possible in order to maintain compatibility among different types of image forming apparatuses. Therefore, rather than completely ignoring the setting value that is applicable to other types of image forming apparatuses, correcting the setting value to a value that is applicable to other types of image forming apparatuses is more suitable in terms of the role of SDK platform 1230.

On the other hand, the printer application 1212 is an application installed in the image forming apparatus 10 beforehand. Therefore, the printer application 1212 largely depends on the type of image forming apparatus 10. Accordingly, it may be considered that the printer application 1212 should precisely operate according to the specification of the type of image forming apparatus 10.

In view of the differences between the SDK platform 1230 and the printer application 1212, the manner in which the two operate is different in a case where, for example, the setting value surpasses an upper limit.

Then, the printer control part 1242 causes a printer 12 to perform a printing process on input image data based on the input instruction (Step S307).

After printing is completed, the printer application 1212 writes data indicating completion of performing the printing process on the object of the printing job in the MIB management part 1243 (Step S308). It is to be noted that, in a case where the printing process is cancelled or failure occurs in the printing process, the printer application 1212 writes an object corresponding to such status (i.e. cancellation or failure).

After the printing data is transmitted to the printer application 1212, the printing service part 1231 periodically refers (polling) to the object identified by the job ID of the printing job in the MIB management part 1243 by using SNMP (Simple Network Management Protocol) with the communication control part 1241 (Step S309 and S310). In a case where the printing service part 1231 detects that data indicating, for example, completion, cancellation, or failure is written to the object (i.e. detects change in the status of the printing job), the printing service part 1231 reports an event(s) including the status of the printing job to the provider application 1221 (Step S311). The UI control part 122 of the provider application 1221 displays the status data included in the event on the control panel 15. Further, the provider application 1221 may transmit the event to the printing network application 21 via the network application management part 310. The printing network application 21 may also display the status data included in the event on the display device 206.

It is to be noted that, the provider application 1221 may report a listener for receiving the event (e.g., function, object) to the printing service part 1231 when inputting a printing request to the printing service part 1231 so that an event can be reported from the printing service part 1231 to the provider application 1221 (SDK application 1220). The printing service part 1231 may maintain (store) the listener and the job ID in association with each other. Thereby, in a case where there is a change of status of a printing job, an event including the status data may be reported to the listener corresponding to the job ID of the printing job.

Hence, with the above-described embodiments of the present invention, printing based on the printing attributes surpassing the range of the common printing attributes can be executed via the provider application 1221. As a result, while attaining benefits of the SDK platform 1230, the performance (functions) of the image forming apparatus 10 can be used more effectively. One of such benefits includes being able to confirm (trace) the status of a printing job.

The present invention is not limited to the specifically disclosed embodiments, and variations and modifications may be made without departing from the scope of the present invention.

The present application is based on Japanese Priority Application No. 2009-212454 filed on Sep. 14, 2009, the entire contents of which are hereby incorporated herein by reference.

What is claimed is:

1. A data processing system comprising:
a data processing apparatus including
  a request receiving part configured to receive a request including a first printing data and printing attributes corresponding to the first printing data, the printing attributes including first printing attributes being commonly applicable to different types of image forming apparatuses, and second printing attributes not commonly applicable to different types of image forming apparatuses,
  a setting part configured to generate a command interpretable by one or more image apparatuses and pertaining only to the second printing attributes included in the printing attributes corresponding to the first printing data, and form second printing data including the first printing data and the command, and
  a transmitting part configured to transmit the second printing data and the first printing attributes corresponding to the first printing data;

the one or more image forming apparatuses including
  a receiving part configured to receive, from the data processing apparatus, the second printing data and the first printing attributes corresponding to the first printing data,
  a service part configured to set only the first printing attributes to the second printing data, and
  a control part configured to control a printing process of the second printing data based on the first printing attributes and the command that has a printing attribute applicable to the one or more image forming apparatuses among the second printing attributes.

2. The data processing system as claimed in claim 1, wherein the service part is configured to correct a value of the first printing attributes to a value applicable to the one or more image forming apparatuses in a case where the value of the first printing attributes is not applicable to the one or more image forming apparatuses.

3. The data processing system as claimed in claim 1, wherein the control part is configured to control the printing process by invalidating the first or second printing attributes that are not applicable to the one or more image forming apparatuses.

4. A data processing method used in a system including one or more image forming apparatuses and a data processing apparatus, the method comprising the steps of:
receiving, at the data processing apparatus, a request including a first printing data and printing attributes corresponding to the first printing data, the printing data including first printing attributes being commonly applicable to different types of image forming apparatuses, and second printing attributes not commonly applicable to different types of image forming apparatuses;
generating, at the data processing apparatus, a command interpretable by the one or more image forming apparatuses and pertaining only to the second printing attributes included in the printing attributes corresponding to the first printing data and forming second printing data including the first printing data and the command; and
transmitting the second printing data and the first printing attributes corresponding to the first printing data from the data processing apparatus to the one or more image forming apparatuses;
receiving, at the one or more image forming apparatuses, the second printing data and the first printing attributes corresponding to the first printing data;
setting, at the one or more image forming apparatus, only the first printing attributes to the second printing data;
controlling, at the one or more image forming apparatuses, a printing process of the second printing data based on the first printing attributes and the command that has a printing attribute applicable to the one or more image forming apparatuses among the second printing attributes.

5. A non-transitory computer-readable recording medium on which a program is recorded for causing a computer to execute a data processing method including one or more image forming apparatuses and a data processing apparatus, the data processing method comprising the steps of:
receiving, at the data processing apparatus, a request including a first printing data and printing attributes corresponding to the first printing data, the printing data including first printing attributes being commonly applicable to different types of image forming apparatuses, and second printing attributes not commonly applicable to different types of image forming apparatuses;

generating, at the data processing apparatus, a command interpretable by the one or more image forming apparatuses and pertaining only to the second printing attributes included in the printing attributes corresponding to the first printing data and forming second printing data including the first printing data and the command; and transmitting the second printing data and the first printing attributes corresponding to the first printing data from the data processing apparatus to the one or more image forming apparatuses;

receiving, at the one or more image forming apparatuses, the second printing data and the first printing attributes corresponding to the first printing data;

setting, at the one or more image forming apparatus, only the first printing attributes to the second printing data;

controlling, at the one or more image forming apparatuses, a printing process of the second printing data based on the first printing attributes and the command that has a printing attribute applicable to the one or more image forming apparatuses among the second printing attributes.

6. The data processing system as claimed in claim 1, wherein the one or more image forming apparatuses further comprise:

an installing part configured to install an application program executed by using the service part, and an inputting part configured to input the second printing data and the first printing attributes received by the receiving part to the service part by using the application program, wherein the transmitting part of the data processing apparatus is further configured to transmit the second printing data and the first printing attributes to the application program of the one or more image forming apparatuses.

7. The data processing method as claimed in claim 4, further comprising the steps of:

installing an application program executed by performing the setting step, and inputting the second printing data and the first printing attributes received, at the data processing apparatus, in the receiving step to the one or more image forming apparatuses by using the application program, wherein the transmitting step includes transmitting the second printing data and the first printing attributes to the application program of the one or more image forming apparatuses.

8. The non-transitory computer-readable recording medium as claimed in claim 5, wherein the data processing method further comprises the steps of:

installing an application program executed by performing the setting step, and inputting the second printing data and the first printing attributes received, at the data processing apparatus, in the receiving step to the one or more image forming apparatuses by using the application program, wherein the transmitting step includes transmitting the second printing data and the first printing attributes to the application program of the one or more image forming apparatuses.

* * * * *